(12) United States Patent
Londono Correa

(10) Patent No.: US 9,091,093 B2
(45) Date of Patent: Jul. 28, 2015

(54) INTERNAL BACKWASH SYSTEM FOR ROBOTIC SWIMMING POOL CLEANER

(75) Inventor: William Londono Correa, Bloomfield, NJ (US)

(73) Assignee: Aqua Products, Inc., Cedar Grove, NJ (US)

( * ) Notice: Subject to any disclaimer, the term of this patent is extended or adjusted under 35 U.S.C. 154(b) by 76 days.

(21) Appl. No.: 13/545,339

(22) Filed: Jul. 10, 2012

(65) Prior Publication Data

US 2014/0014140 A1    Jan. 16, 2014

(51) Int. Cl.
*E04H 4/16*        (2006.01)
*B08B 9/087*       (2006.01)

(52) U.S. Cl.
CPC .............. *E04H 4/1654* (2013.01); *B08B 9/087* (2013.01)

(58) Field of Classification Search
CPC ....... E04H 4/1654; E04H 4/1663; E04H 4/16; E04H 4/1636; E04H 4/1609; E04H 4/1618; B08B 9/087

USPC ......... 15/1.7, 300.1, 104.05, 301, 302; 134/6, 134/30, 32; 210/167, 241, 767
See application file for complete search history.

(56) References Cited

U.S. PATENT DOCUMENTS

| | | | | |
|---|---|---|---|---|
| 3,571,840 | A | * | 3/1971 | Gleaton et al. ............... 15/312.1 |
| 4,429,429 | A | * | 2/1984 | Altschul ........................ 15/50.1 |
| 4,683,067 | A | * | 7/1987 | Aleman et al. ................ 210/767 |
| 4,872,238 | A | * | 10/1989 | Crotts et al. .................... 15/302 |
| 2002/0121289 | A1 | * | 9/2002 | Brown et al. ..................... 134/6 |
| 2007/0056124 | A1 | * | 3/2007 | Wichmann et al. .............. 15/1.7 |
| 2008/0250580 | A1 | * | 10/2008 | Lavabre et al. .................. 15/1.7 |
| 2009/0100619 | A1 | * | 4/2009 | Baird et al. ................. 15/104.05 |

\* cited by examiner

*Primary Examiner* — Robert Scruggs
(74) *Attorney, Agent, or Firm* — Abelman, Frayne & Schwab

(57) ABSTRACT

A self-propelled robotic cleaning apparatus for cleaning a submerged surface of a pool or tank includes a housing defining an interior chamber containing a filter assembly for filtering water flowing through at least one water inlet formed in the base plate. A filter backwash assembly is positioned within the interior chamber and has at least one fluid discharge outlet for providing a pressurized flow of a fluid towards the exterior surface of the filter assembly as a backwash to rinse and dislodge the debris therefrom.

30 Claims, 11 Drawing Sheets

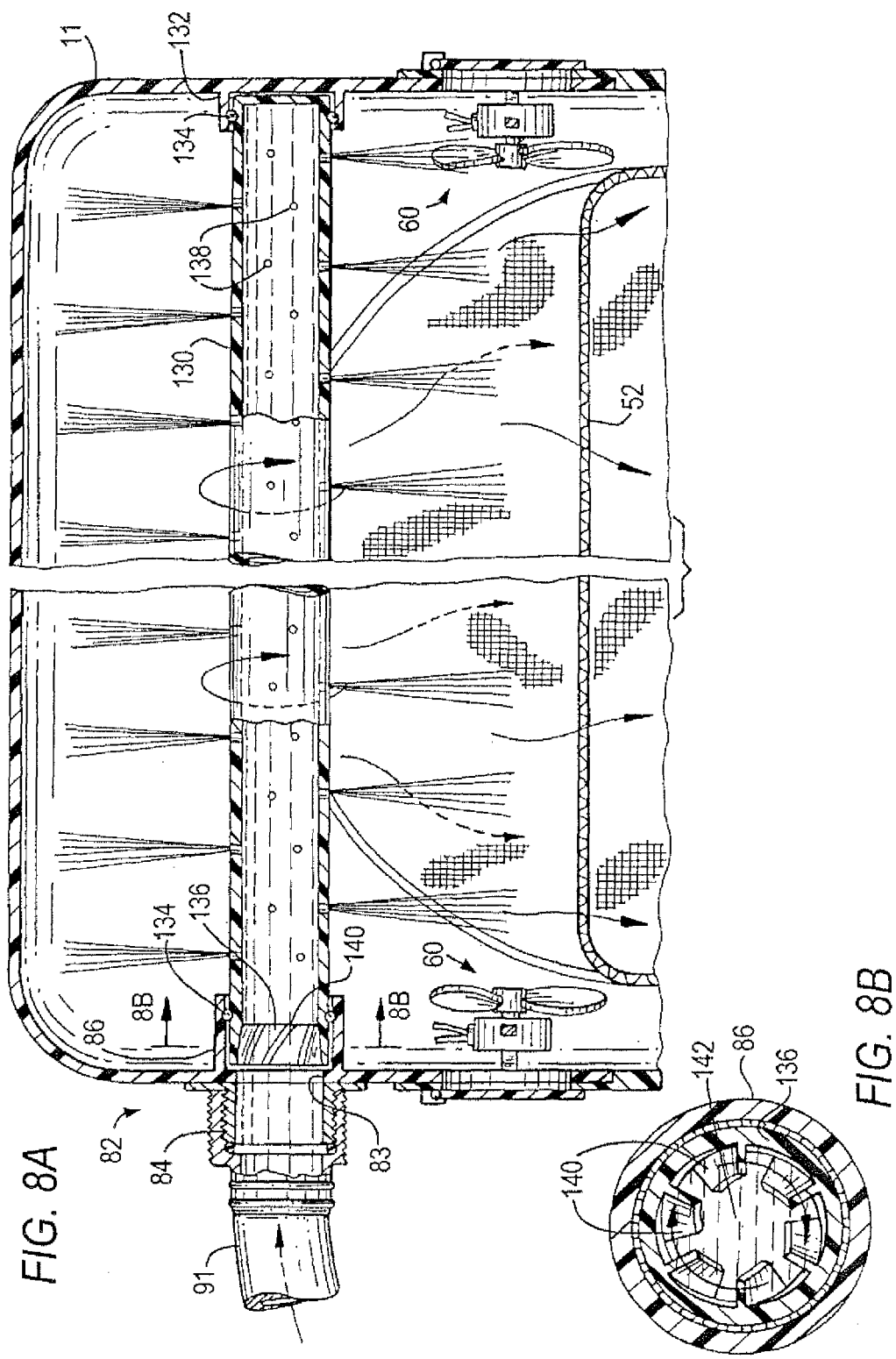

INTERNAL BACKWASH SYSTEM FOR ROBOTIC SWIMMING POOL CLEANER

FIELD OF THE INVENTION

The present invention relates to a submersible robotic pool and tank cleaning apparatus having one or more internal filtering devices for separating and isolating undesirable contaminants and debris from the pool or tank environment, and more specifically to a filter backwash system for improving the maintenance and operation of the one or more internal filtering devices within the cleaning apparatus.

BACKGROUND OF THE INVENTION

Robotic pool cleaning devices are mounted on rotatable supports, such as wheels, brushes and/or tracks, and are propelled or otherwise travel along submerged surfaces of a pool, tank or the like and, through the use of suction, thereby "vacuum" the pool surfaces over which they pass. The pool cleaning devices can be propelled over the surfaces of the pool by a directional or random water jet propulsion system, or by one or more drive motors that are coupled to (e.g., to the wheel axles) and cause the rotation of the rotatable supports.

The cleaning devices configured with an internal filtering system have an interior chamber with one or more filters mounted therein. The internal filtering systems are effective to capture and isolate contaminants and/or debris from portions of the interior chamber where it is highly desirable that contamination not encroach. The filtered water is then discharged back into the pool or tank as a pressurized stream.

The filter can be fabricated from a mesh material that is sewn into a configuration that is stretched over and/or held in place over a supporting open framework that is securely positioned inside the cleaning body or housing. Alternatively, rigid filter cartridges can be used in which the filter medium is a pleated web and which can also include an open mesh wire or plastic support to reduce collapsing of the finer pleated filter material. Filter cartridges are commonly cylindrical and include a separate flexible seal in the form of a ring that is fitted over the circular openings at each end.

During cleaning operations, the debris captured by the filter medium can eventually cover and block the porous filter medium thereby reducing the filtering efficiency of the filter, and hence diminish the cleaning operation of the cleaner. Presently, pool cleaners having one or more internal filters must be cleaned manually to remove and unclog the debris that is captured by the filter. The filters can be in the form of any well-known filter bag, screen, filter cartridge or filter canister.

When the filter becomes filled or its surface area is clogged with debris, the end user must remove the cleaner from the pool, open the cleaner to gain access to its interior, and disengage any fasteners that retain the filter in its required position within the interior therein. The filter is then removed from the cleaner and the debris is removed filter therefrom by hand and/or by running clean water over the filter, illustratively under a faucet or a conventional garden hose. Once the filter is rinsed and cleaned from debris, the end user manually reinstalls the filter back into the interior chamber by properly positioning and securing it therein, and then closing the cleaner housing. The pool cleaner can then be submerged back in the pool for further pool cleaning operations.

The maintenance involved to clean the one or more filters is not generally complicated, but it can be time consuming and require the end user to get his hands "dirty" to fulfill the required maintenance task of cleaning the filter. In addition, the end user must carefully reinstall the filter to its correct position and/or alignment within the interior chamber and properly secure it therein, since an improperly installed filter can cause physical damage the filter and/or allow undesirable debris to pass therethrough without being captured.

SUMMARY OF THE INVENTION

The above problems and disadvantages are solved and avoided by the embodiments of the apparatus and methods of the present invention that are described below. In the description that follows, it will be understood that the cleaner moves on supporting wheels, brushes, rollers or tracks that are aligned with the longitudinal axis of the cleaner body when it moves in a straight line. References to the front or forward end of the cleaner will be relative to its then-direction of movement.

The present invention is directed to various embodiments of filter cleaning assemblies and systems installed within the interior chamber of the automated pool or tank cleaner. As described in greater detail below, a filter cleaning assembly can be provided by various structures that dispense pressurized streams of water along at least portions of the exterior surface of the filter medium of a filter device in order to backwash or otherwise rinse the porous surface of the filter medium to free and disperse any debris that may be ensnared thereon and/or otherwise impairs or occludes the flow of water through the filter medium. The filter cleaning assemblies described herein include an inlet formed in the housing of the cleaner that is configured to receive a pressurized source of clean water, preferably through a fitting attached to a conventional garden hose, and the pressurized water from the inlet flows through the filter cleaning assembly from which it is streamed or sprayed over the outer surface of the filter medium. In this manner, the force of the water pushes any debris that is trapped against the surface of the filter medium away therefrom and downwards to the bottom of the interior chamber where the debris can be discharged through one or more access panels or the inlet port(s) formed on the bottom or base plate of the cleaner. Preferably, the base plate below the filter assembly is removed and the debris backwashed from the filter can drop directly into a suitable receptacle or surface for disposal.

In general, a self-propelled robotic cleaning apparatus for cleaning a submerged surface of a pool or tank can include a housing having a front portion, an opposing rear portion and adjoining side portions defining the periphery of the apparatus. A base plate with at least one water inlet is mounted to the lower portion of the housing. Rotationally-mounted supports are coupled to the housing to move the cleaning apparatus along a cleaning path. In an embodiment, a water pump is mounted within the interior chamber of the housing. The water pump is configured to draw water and debris from the pool or tank through the one or more water inlets formed in the base of the cleaner for filtering, and then causes the discharge of the filtered water through at least one water discharge outlet. The internal water pump provides a pressurized water jet that is expelled from the water-discharge outlet and which can be configured to propel the cleaner in a forward or reverse direction. Alternatively, the water pump can be provided remotely from the cleaner and connected by a hose. In this latter embodiment, one or more drive motors are provided to rotate the rotationally-mounted supports to move the cleaner in a forward and rearward directional path.

In one embodiment, a self-propelled robotic cleaning apparatus for cleaning a submerged surface of a pool or tank includes a housing having a cover and a base. The base has at least one water inlet, and the housing cover is removably fastened to the base to define an interior chamber. A means for propelling the cleaning apparatus including rotationally-mounted supports is coupled to the housing for moving the apparatus in a forward direction over the submerged surface of the pool or tank. A filter assembly is positioned within the interior chamber for filtering water by capturing debris flowing through the at least one water inlet from the pool or tank. A filter backwash assembly is positioned within the interior chamber and has at least one water discharge outlet for providing a pressurized flow of a fluid (e.g., water or a gas) towards the filter assembly to rinse and dislodge the debris therefrom.

In one aspect, the filter backwash assembly includes a plurality of tubes suspended from the housing cover and is configured to circumscribe at least a portion of the filter assembly. The at least one fluid discharge outlet includes a plurality of spaced-apart perforations. In another aspect, the filter backwash assembly is suspended from a mounting bracket having a lower portion coupled to the plurality of tubes, and an upper portion extending through an orifice formed in the housing cover. The upper portion can be configured to receive a pressurized fluid from an external source. In one aspect, the upper portion of the mounting bracket is configured to receive the fluid from a hose.

In another embodiment, the filter backwash assembly includes an oscillating sprinkler suspended from the housing cover and is configured to oscillate in a predetermined pattern over the filter assembly. In one aspect, the at least one fluid discharge outlet includes a plurality of spaced-apart perforations that are directed toward the filter assembly. In another aspect, the oscillating sprinkler extends normally from the housing cover relative to a longitudinal axis of the cleaning apparatus.

In yet another aspect, the at least one fluid discharge outlet is a sprinkler arm, and the oscillating sprinkler further comprises a means for oscillating the sprinkler arm coupled to the sprinkler arm. In one aspect, the oscillating means includes a fluid turbine operatively coupled to the sprinkler arm. Alternatively, the oscillating means includes a motor coupled to the sprinkler arm.

In yet another embodiment, the filter backwash assembly includes a rotating sprinkler assembly suspended from the housing cover and configured to rotate over the filter assembly. In one aspect, the at least one fluid discharge outlet includes a plurality of spaced-apart perforations that are directed toward the filter assembly. In another aspect, the rotating sprinkler assembly includes a plurality of sprinkler arms extending radially outward at equally spaced-apart intervals.

In an embodiment, the filter backwash assembly includes a tubular sprinkler assembly suspended from the housing cover and configured to rotate above the filter assembly. In one aspect, the tubular sprinkler assembly includes a fluid turbine for rotating the tubular sprinkler assembly.

In yet another embodiment, the cleaning apparatus further comprises means for releasing the fluid and debris from within the interior chamber of the cleaning apparatus. In one aspect, the means for releasing the fluid and debris includes a tray slidably coupled to at least one of the base and/or housing. In another aspect, the tray includes a debris outlet port.

In one aspect, the means for releasing the fluid and debris includes an access panel formed in a sidewall of the housing. In still another aspect, the means for releasing the fluid and debris includes a debris outlet port formed in the base.

In yet another embodiment, a method for cleaning a filter mounted in an interior chamber of a self-propelled robotic cleaning apparatus that cleans a submerged surface of a pool or tank is provided. The method comprises coupling an external source of fluid to an adapter which is provided on a housing of the cleaning apparatus. The adapter is coupled to an internal sprinkler assembly mounted within the interior chamber. A flow of the fluid is provided from the external fluid source to the internal sprinkler assembly mounted within the interior chamber for a predetermined time. The fluid from the internal sprinkler assembly is distributed over at least a portion of the filter mounted in the interior chamber. In one aspect, the fluid and debris is discharged from the interior chamber.

BRIEF DESCRIPTION OF THE DRAWINGS

The invention will be described in further detail below and with reference to the attached drawings in which:

FIG. 8A is a cross-sectional side elevation view of the fourth embodiment of the filter backwash assembly taken along lines 8A-8A of FIG. 8;

FIG. 8B is a cross-sectional front elevation view of a water turbine taken along lines 8B-8B of FIG. 8A and suitable for use in the fourth embodiment of the filter backwash assembly;

Figure 1:
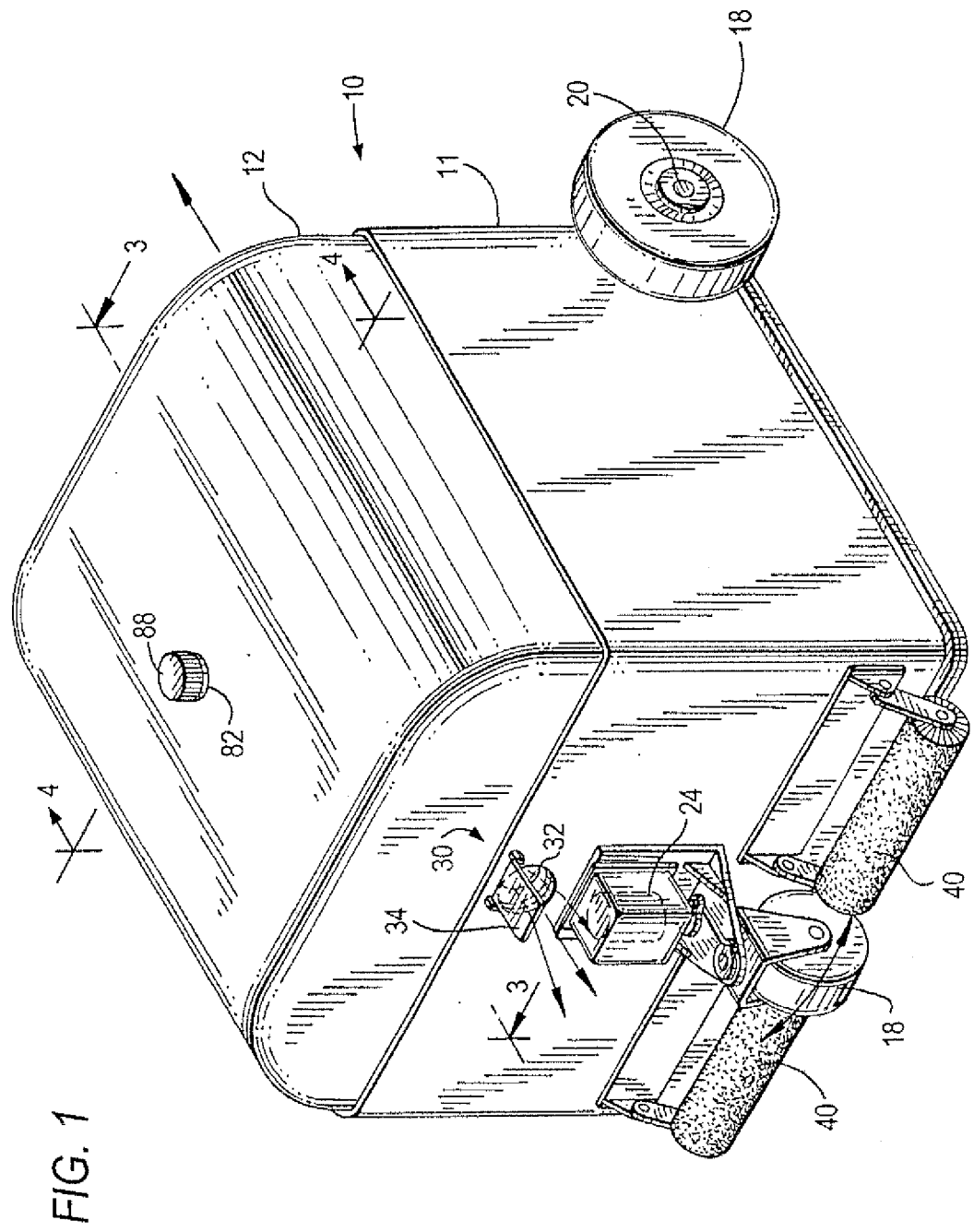
FIG. 1 is a top, right side perspective view of an embodiment of a self-propelled robotic pool or tank cleaner suitable for receiving a filter backwash assembly of the present invention.
Figure 2:
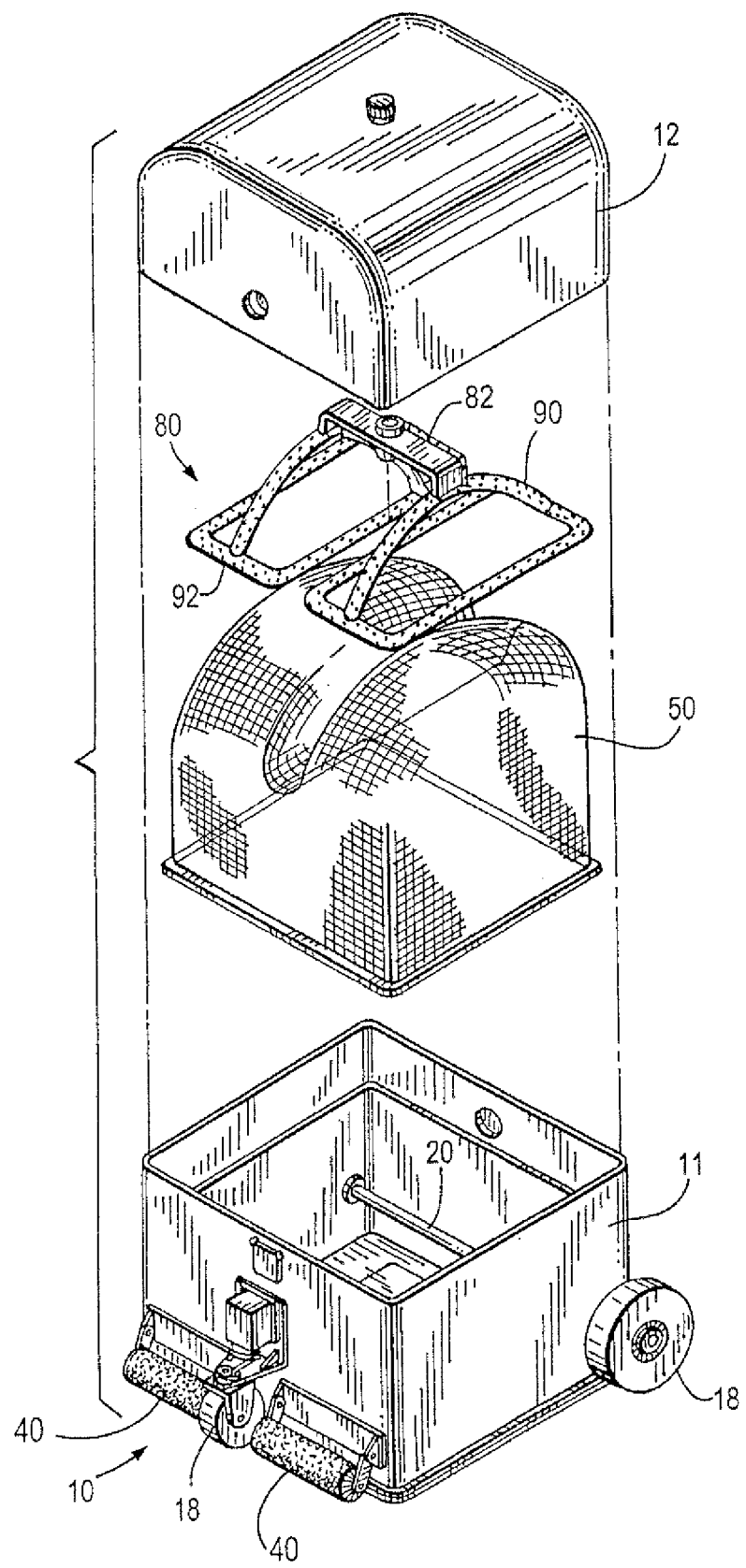
FIG. 2 is an exploded perspective view of the pool cleaner of FIG. 1 illustrating a first embodiment of the filter backwash assembly positioned over the filter assembly within an interior chamber of the cleaner of FIG. 1.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DESCRIPTION OF THE PREFERRED EMBODIMENTS

For purposes of providing a better understanding the invention as further described below, terms connoting direction and positioning of components are defined as follows:

- longitudinal axis of the cleaner is defined as extending centrally through the cleaner in the direction of movement;
- movement of the cleaner in a forward direction is the direction that the cleaner is presently being propelled or driven along its cleaning path;
- movement of the cleaner in a reverse direction is a direction that is opposite to the forward direction along the cleaning path;
- the front of the cleaner is defined as the portion of the cleaner extending perpendicular along the longitudinal axis in the forward direction of movement as the cleaner travels along its cleaning path;
- "top", "bottom", "upper" and "lower" are adjectives that denote different cleaner components, as well as define the relative positioning of such components with respect to a central vertical axis extending centrally through the housing cover and base of the cleaner;
- the backwash assembly of the present invention utilizes a "fluid" for purposes of cleaning the interior chamber and/or filter medium and such fluid can be in the form of a liquid (e.g., water) or a gas (e.g., compressed air); and
- for convenience, the apparatus may be referred to as a "pool cleaner" or simply a "cleaner".

Referring generally to FIGS. 1-5, an embodiment of a self-propelled robotic pool or tank cleaner 10 illustrating an internal filter backwash assembly 80 (see FIG. 2) of the present invention is illustratively shown. The pool cleaner 10 generally comprises a housing 11 having a cover 12 and a base plate, or base 14 with at least one water inlet 16 (see FIG. 3) formed in the bottom surface 27 of the base 14. The housing cover 12 is removably fastened over the base 14 to define an interior chamber 26. The housing cover 12 and base 14 are removably fastened with one or more fasteners (not shown), such as a clasp, latch, spring clip, bolt or other well-known fasteners. A gasket or other seal (not shown) can be inserted between the base 14 and cover 12 to prevent water flowing therebetween into and out of the interior chamber 26. The housing cover 12 and base 14 are preferably made of a polymeric material that is resistant to the sun and pool chemicals, such as polyvinylchloride (PVC) or polypropylene, among other well-known thermoplastic materials, aluminum and/or alloys thereof, and/or combinations thereof, and/or other water impermeable materials.

Rotationally-mounted supports 18 are coupled to the housing 11 for moving the cleaner 10 over the submerged surface of the pool or tank 2. As shown in the drawings, the rotationally-mounted supports 18 are wheels mounted on axles 20, in which a pair of wheels 18 are rotatably mounted to opposing ends of a single axle at one end of the housing. A single wheel is centrally mounted to the other end of the housing to enable steering of the cleaner 10. For example, steering motor 24 can be used to change the direction of the wheel 18 to turn the cleaner in accordance with a random or predetermined cleaning pattern. Alternatively, a pair of wheels can be mounted on the opposing ends of axles positioned at opposite ends of the cleaner 10. A person of ordinary skill in the art will appreciate that the rotationally-mounted supports 18 can be or include one or more tracks. For a detailed understanding of various wheel/axle arrangements and steering control mechanisms, the reader is directed to commonly-assigned U.S. Pat. No. 6,742,613, the contents of which are incorporated herein by reference in its entirety.

The cleaner 10 also includes one or more brushes 40 that are mounted at opposing ends of the housing. The brushes 10 can be separate from the rotationally mounted supports 18 as illustratively shown in the drawings. Alternatively, the brushes can be formed as a part of the rotationally mounted supports 18 such as rollers and extend transverse to the front and/or rear ends of the cleaner. As illustratively shown in FIG. 1, the brushes can pivotally rotate upward and downward to permit access into the interior chamber 26 of the cleaner during maintenance. For example, brush 40 proximate the pair of support wheels 18 can pivot upward and downward, as illustratively shown in phantom in FIG. 1. For a detailed understanding of various brushes that can be implemented and their arrangements on the cleaner, the reader is directed to the above-identified commonly-assigned U.S. Pat. No. 6,742, 613.

The cleaner 10 can be propelled by one or more drive motors (not shown) which engage and rotate one or more of the wheels 18 in a well-known manner. In this embodiment, control means (not shown) are provided to periodically reverse the direction of movement to assure that the cleaner does not become immobilized, e.g., by an obstacle in the pool. If, for example, the pool cleaner does not change its orientation with respect to the bottom or sidewall as indicated by a signal from an on-board sensor (e.g., mercury switch) indicating that such transition has occurred during the prescribed period, e.g., two minutes, a control circuit will automatically change the direction of the drive means (i.e., drive motors or water jet propulsion valve assembly) in order to permit the cleaner to move away from the obstacle and resume its scanning pattern. Sensors, such as magnetic and infrared-responsive signaling devices can also be provided to change the direction of movement in response to prescribed conditions, e.g., absence of forward movement due to an obstacle. In addition, the control means can automatically steer the cleaner to the right or left while moving in either the forward or reverse direction. Power for the cleaner 10 can be supplied by a buoyant electrical cable 22 (shown in phantom in FIG. 3) attached to an external power source, such as a transformer or a remote battery contained in a floating housing at the surface of the pool 2, although such power sources are not considered limiting. Alternatively, one or more rechargeable battery packs (not shown) can be provided internally to provide power to the cleaner 10.

Figure 3:
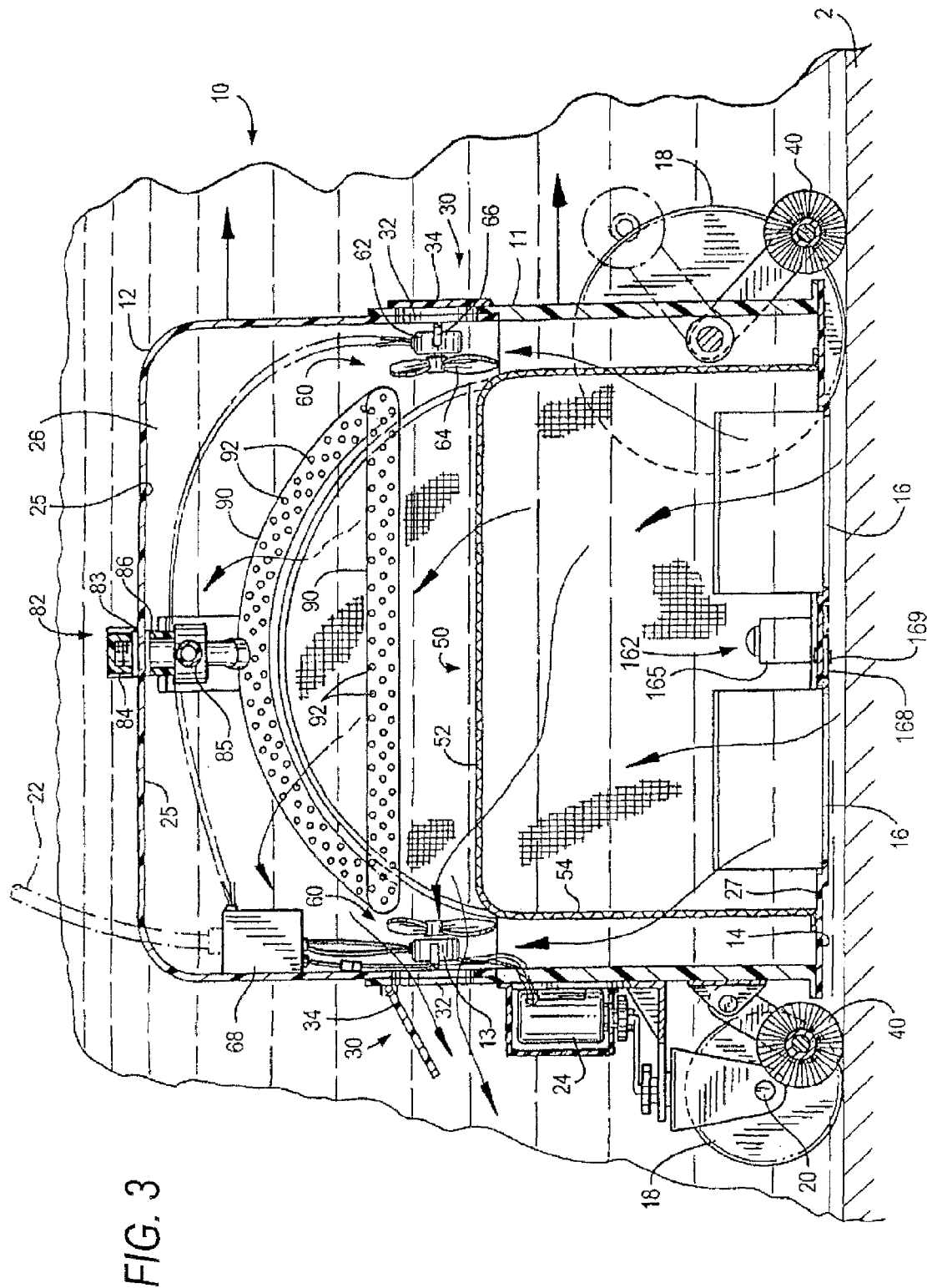
FIG. 3 is a cross-sectional side elevation view of the pool cleaner taken along lines 3-3 of FIG. 1 illustrating the relationship of the backwash assembly of FIG. 2 within the interior chamber of the pool cleaner.
Figure 4:
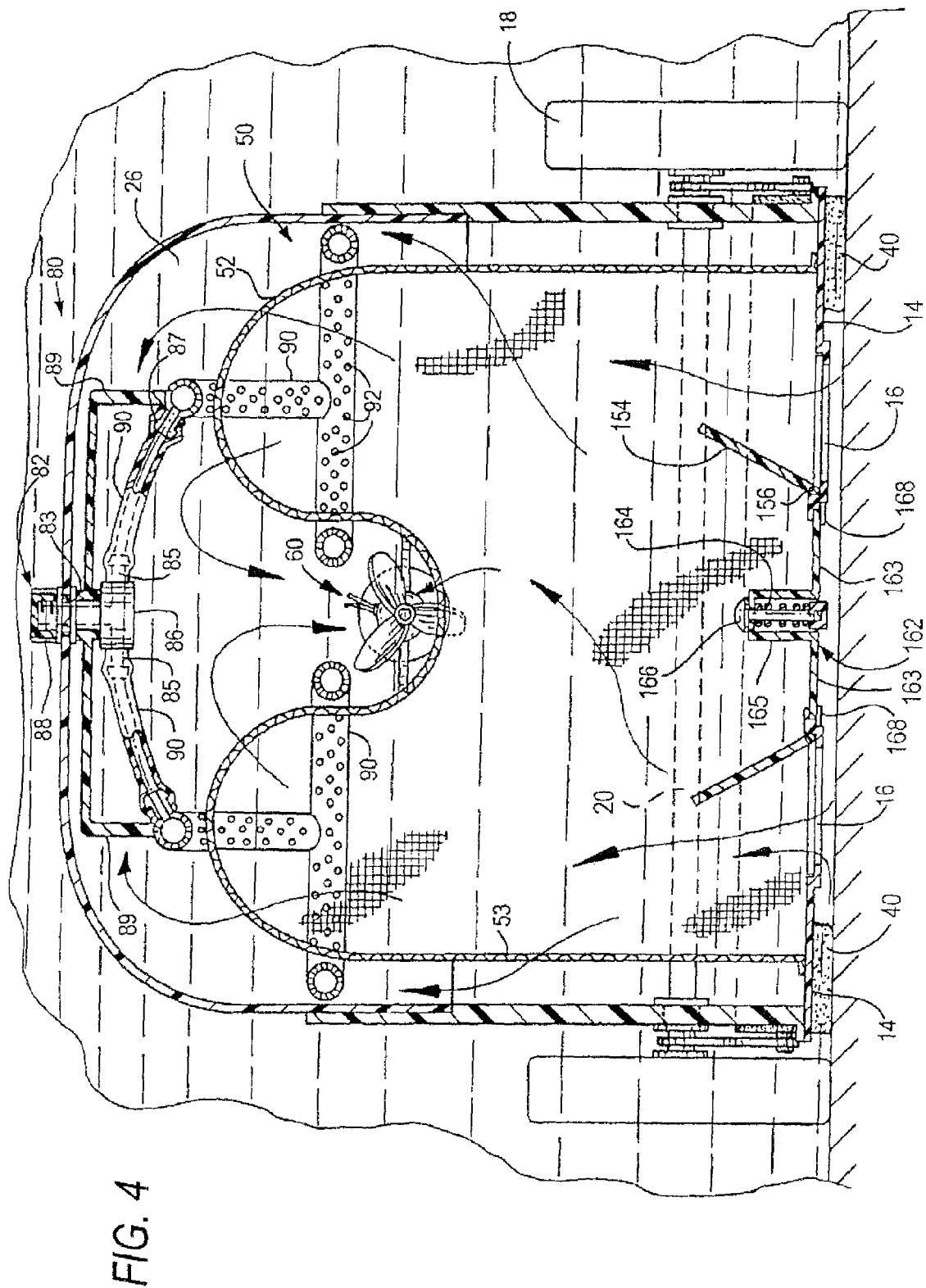
FIG. 4 is a cross-sectional front elevation view of the pool cleaner taken along lines 4-4 of FIG. 1 illustrating the filter backwash assembly of FIG. 2.

Referring to FIGS. 3 and 4, the cleaner 10 further includes at least one water inlet 16 formed through the bottom surface 27 of the base 14, a filter assembly 50 positioned within the interior chamber 26, and a water discharge assembly 30 for discharging water from the interior chamber 26 of the cleaner 10. The water discharge assembly 30 includes at least a water pump 60 and a discharge port 32. In the embodiment shown in the drawings, the water pump is also provided within the interior chamber 26. Alternatively, in a second embodiment, the water pump 60 is remotely located from the cleaner 10. In either embodiment, the water pump 60 creates a low presser environment within the interior chamber 26, which causes water and debris from the pool or tank 2 to be drawn through the at least one water inlet 16 into the interior chamber 26. The drawn pool water and debris is filtered by the filter assembly, and the filtered water is discharged from the cleaner by the water discharge assembly 30. The debris and/or other contaminants are separated from the intake water and isolated within the interior chamber 26 by the filter assembly 50, as described below in further detail with respect to FIGS. 2-8.

Referring now to FIG. 3, the water discharge assembly 30 includes a pair of water pumps, one of which is mounted within the interior chamber 26 proximate the forward direction end of the cleaner 10 and the other is mounted within the interior chamber 26 proximate the rearward direction end of the cleaner 10. Each water pump 60 includes a motor 62 that rotates an impeller or propeller 64 via a rotatable shaft 66. The water pumps 60 are provided with electrical power via the buoyant power cable 22 or internal batteries, and are individually controlled by a controller 68.

A discharge port 32 is formed on opposing forward and rearward direction ends of the housing 11 or housing cover 12 and can include a discharge port cover or flap 34, which can be spring loaded and opened and closed by the pressurized water jet that is expelled through the discharge port 32 by the corresponding water pump 60. During operation, one of the dual water pumps 60 is powered on, while the other water pump is off. As shown in FIG. 3, the left side water pump 60 is powered on while the right side water pump is turned off. The low pressure environment within the chamber created by the powered on water pump 60 draws the water through the one or more inlets 16, and through the filter assembly 50. The high water pressure from the powered on pump 60 is directed and forced out of the interior chamber 26 through the corresponding discharge port 32 as a water jet as illustratively shown by the arrows on the right side of the drawing. The force of the water jet is sufficient to push and maintain the discharge port flap 34 in an open position. The water jet expelled by the cleaner propels the cleaner forward (e.g., to the right of the drawing) until the cleaner contacts or otherwise senses an opposing wall or obstacle. At that time the powered-on pump is switched off by the controller 68 and the powered-off pump 60 is subsequently powered on to reverse the direction of movement of the cleaner in a similar manner.

Although the dual pumps 60 are shown as separate pumps installed on opposite sides on the interior chamber 26, other arrangements of the dual water pump propulsion system can be provided. For example, a water pump having dual propellers positioned along a longitudinal axis in the interior chamber with one or more directional discharge conduits to propel the cleaner in a forward direction can be implemented, as illustratively shown and described in commonly assigned U.S. patent application Ser. No. 13/135,684, filed Jul. 12, 2011 and PCT application no. PCT/US2011/047435, filed Aug. 11, 2011, both entitled "Water Jet Pool Cleaner with Opposing Dual Propellers", and both of which are incorporated by reference herein in their entireties.

In yet another embodiment, the pool cleaner can include a vertical water pump mounted in the interior chamber and a flap valve assembly provided over the water pump to selectively discharge the water jet to propel the cleaner in the forward direction. For a detailed understanding of a vertically mounted pump and flap valve assembly, the reader is directed to commonly assigned U.S. Pat. Nos. 6,412,133 and 7,900,308, the contents of which are incorporated by reference in its entirety.

In any of the water pump embodiments described above, the water discharge assembly 30 includes a directional water jet valve propulsion assembly which controls the direction of a pressurized water jet stream to propel the cleaner 10 in a forward direction, where the front of the cleaner 10 is defined as the direction in which the cleaner 10 is then moving. Accordingly, drive motors for rotating the wheels 18 are not required to move the cleaner 10 along the submerged surface of the pool or tank 2.

In still another embodiment, a single pump can be provided either internally or externally to create the low pressure environment to draw the pool water and debris into the interior chamber for filtering and subsequent discharge of the filtered water from the cleaner. However, propulsion of the cleaner is provided by one or more drive motors that cause the rotational supports (e.g., wheels or tracks) to rotate and move the cleaner along its cleaning path.

Referring now to FIGS. 2-5, a filter assembly 50 is positioned within the interior chamber 26 formed below the underside 25 of the housing cover 12 and is secured to the bottom interior surface 27 of the base 14. The filter assembly 50 includes a filter body 52 having an upper portion in fluid communication with side walls 53 that terminate at the bottom interior surface 27 of the base 14. The filter body 52 circumscribes the at least one inlet 16 and is preferably rectangular in shape, although other filter body shapes are contemplated, such as circular, oval, and/or other combinations of shapes. The filter body 52 can be a screen or mesh fabricated from a tear-resistant and corrosion-resistant polymeric non-corrosive material, such as stainless steel or other sturdy material which can retain its shape with minimal deformation. Alternatively, the filter body 52 can be a filter bag fabricated from nylon or other appropriate filter media well known to the art. The filter body 52 can also be pleated or corrugated to increase its surface area. In another aspect, the filter body can also be formed with a supporting skeleton or frame structure to prevent the collapse and/or deformation of the filter medium as the pressure drop increases.

Water from the pool or tank that is drawn through the water inlets 16 flows into the portion of the interior chamber 52 that is circumscribed by the interior surface of the filter body 52 and the bottom surface of the base 14. The area within the circumference of filter body defines an "unfiltered zone". As the water flows through the filter body 52 into the exterior area of the filter that defines a "filtered zone", undesirable debris or particles are isolated and retained in the unfiltered zone, and the filtered water is subsequently discharged by the water discharge assembly 30 into the pool or tank 2.

As debris is collected and retained by the filter body 52, periodic maintenance is required to clean the filter. The present invention is directed to an internal backwash assembly 80 to assist the user in rinsing off and eliminating the collected debris from the interior chamber 26 of the cleaner 10.

Referring again to FIGS. 2-5, a first embodiment of the internal backwash assembly 80 is illustratively shown. The backwash assembly 80 is mounted within the interior chamber 26 and is positioned substantially adjacent the external surface of the filter body 52. The backwash assembly 80 includes a water inlet conduit adapter 82 and a plurality of tubes 90 each having a plurality of perforations 92 for spraying water within the interior chamber 26 during maintenance of the cleaner 10. Although the present invention is illustratively described as dispersing or spraying water within the interior chamber 26 and over the filter body 52, a person of ordinary skill in the art will appreciate that other fluids can be utilized, including a pressurized flow of gas (e.g., compressed gas) from a compressor (not shown) or other source of pressurized fluid suitable for backwashing the interior chamber and/or filter 50 during maintenance of the cleaner 10.

More specifically, the inlet conduit adapter 82 is preferably a cylindrical tube extending vertically through an orifice 83, which is formed in the housing 12 and sized to receive the cylindrical inlet conduit adapter 82. The cylindrical inlet conduit adapter 82 is illustratively shown extending vertically through the housing cover 12. However the positioning of the inlet conduit adapter is not considered limiting as the inlet conduit adapter 82 can alternatively be positioned in a sidewall of the housing 11 or housing cover 12. The inlet conduit adapter 82 is preferably fabricated from plastic or a corrosion-resistant metal material and includes an external portion 84 that is configured and dimensioned to connect to or otherwise receive an external source of water, such as delivered through a conventional garden hose 91. The external portion 84 of the inlet conduit adapter 82 is positioned over the external surface of the housing 11 or housing cover 12. A cap or seal 88 is provided to cover the external portion 84 when the backwash assembly 80 is not in use. The adapter 82 further includes an internal portion 86 which extends from the external portion 84 through the orifice 83 and into the interior chamber 26.

The internal portion 86 of the adapter 82 includes one or more outlet fittings 85, each of which is dimensioned to connect to an end of a perforated tube 90. The one or more perforated tubes are arranged to circumscribe at least a portion of the filter assembly 50 to provide pressurized streams or a spray of water directed at the filter assembly 50 during maintenance of the cleaner 10. The plurality of perforations 92 can be formed in the wall of the tube at predetermined locations to control the direction and volume or pressure of the water spray which is predominantly at the filter medium of assembly 50. Alternatively, the plurality of perforations 92 can be formed around the circumference of the tubes 90 so that the water spay is directed at the filter assembly 50 and in other directions such as towards the inner walls of the interior chamber 26, as illustratively shown in FIG. 5.

Referring again to FIGS. 2-5, the arrangement of the tubes 90 is preferably configured to circumscribe and/or conform to the shape of the filter assembly 50 so as to spray at least the top portion of the filter body 52 to thereby push debris therein downwards to the bottom surface 27 of the base 14. A plurality of tube fittings or connectors 87 can be utilized to connect adjacent ends of two or more tubes 90 together, based on the configuration of the backwash assembly 80. The tubes 90 can be linear and/or arcuate and are preferably connected end-to-end (in any direction) such that a closed circulatory system is formed. In this manner, the water flowing through the one or more tubes 90 is dispensed only through the plurality of perforations 92. In an alternative embodiment, one or more tubes 90 can remain open at one end to provide a larger volume of a pressurized stream of water that is directed at a particular area of the filter body 52.

The backwash assembly 80 can also include one or more support members 89 that extend from the internal portion 86 of the inlet conduit adapter 82 to one or more of the tube fittings 87 or otherwise retain the tubes using known fasteners or systems to provide additional support for the backwash assembly 80 within the interior chamber 26. The support members 89 can be rails or beams fabricated from plastic, ceramic or a non-corrosive metal material. The support members 89 extend over the filter 50 a distance that is suitable to disperse the fluid with enough pressure and force to rinse or otherwise dislodge the debris without damaging the filter medium.

Figure 6:
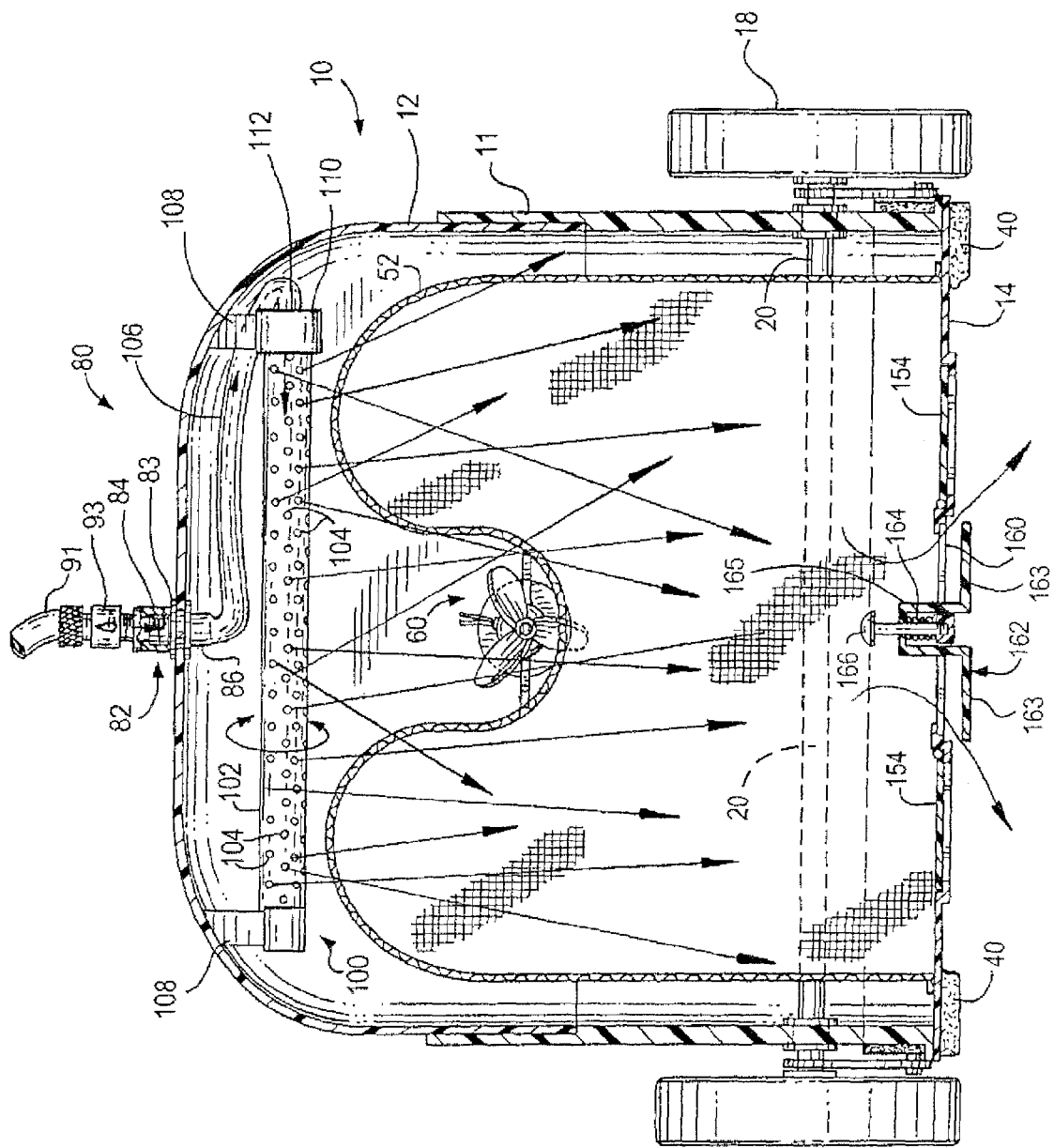
FIG. 6 is a cross-sectional front elevation view of the pool cleaner taken along lines 4-4 of FIG. 1 illustrating a second embodiment of the filter backwash assembly while spraying water over the filter assembly of the pool cleaner.

Referring now to FIG. 6, a second embodiment of the internal backwash assembly 80 is illustratively shown. In a manner similar to the first embodiment, the backwash assembly 80 is mounted within the interior chamber 26 and is positioned substantially adjacent the external surface of the filter body 52. The second embodiment of the backwash assembly 80 includes a water inlet conduit adapter 82 and a sprinkler assembly 100, which includes a sprinkler arm 102, oscillating means 110, an interior connecting tube 106 and one or more support arms 108. The sprinkler arm 102 includes a plurality of perforations 104 for spraying water within the interior chamber 26 during maintenance of the cleaner 10.

The backwash sprinkler assembly 100 is illustratively shown mounted at opposing ends to the upper interior surface of the housing cover 12 by the support arms 108. The support arms 108 can be formed as part of the housing cover 12 by injection molding such that the opposing ends of the sprinkler arm 102 are retained or clasped by snap-fitting to the support arms. Alternatively, the support arms can be secured to the upper interior surface of the housing cover 12 and/or the opposing ends of the sprinkler arm 102 by one or more fasteners. The sprinkler assembly 100 is illustratively shown as being mounted in the interior chamber in a direction normal to the longitudinal axis of the cleaner 10. However, a person of ordinary skill in the art will appreciate that the sprinkler assembly 100 can be mounted within the interior chamber 12 in other directions, such as along the longitudinal direction, among other directions.

The sprinkler assembly 100 includes a water inlet port 112 positioned at the proximal end of the sprinkler arm 102. A flexible interior tube or hose 106 is secured at one end to the inlet port 112 and to an outlet fitting provided at the internal portion 86 of the inlet conduit adapter 82. The external portion 84 of the inlet conduit adapter 82 is preferably the same as described with regard to the embodiment shown in FIGS. 3-5 and extends through an orifice 83 formed in the housing cover 12 or housing sidewalls 11. The external portion 84 is also configured to receive or connect to a conventional garden hose 91 as described above. A conventional shut-off valve 93 (see FIG. 6) of any known design can be connected (e.g., threaded and/or quick connector) between the downstream end of the garden hose 91 and the external portion 84 of the inlet conduit adapter 82 to enable the user to control the external flow of water into the sprinkler assembly 100 while standing next to the cleaner 10 instead of having to walk over to the upstream end of the garden hose which is connected to a water tap or spigot, or bringing the cleaner near the water tap to backwash (i.e., rinse) the interior chamber 26 and filter body 52. The shut-off valve 93 can be utilized for any of the embodiments described herein.

An oscillating means (or oscillator) 110 is provided at one end of the sprinkler arm 102. In one embodiment, the oscillating means 110 is an electric motor that is configured to rotate the sprinkler arm 102 at a predetermined number of degrees of rotation about the longitudinal axis of the sprinkler arm 102. In this embodiment, the oscillator 110, i.e., electric motor, can be mounted at either end of the sprinkler arm 102 and is electrically connected to the controller 68 via electrical conductors (not shown) for providing power to and controlling oscillation of the sprinkler arm 102.

Preferably the oscillation means 110 includes a water turbine, which is rotated by the force of the water flowing from the external source, e.g., through the garden hose 91. An illustrative water turbine is described below with reference to FIG. 8B. The oscillation means 110 is similar to that of a well-known oscillating lawn sprinkler where the water turbine is centrally aligned and coupled to a cam. A rod or arm is provided with one end that extends from the cam and an opposing end connected to an end of the sprinkler arm 102. The incoming water from the external source flows to the water turbine to causes it to rotate, and is then channeled to the sprinkler arm 102, which in turn sprays the water through the perforations 104 to backwash the filter body 52 below.

During operation, water from the garden hose 91 flows through the adapter 82, the interior hose 106 and the inlet port 112, and a portion of the water flow is diverted to rotate the water turbine provided within the proximal end of the sprinkler arm 102. The force of the diverted water rotates the turbine which in turn rotates the cam. The rotating cam moves the support arm back and forth so that the sprinkler arm also rotates positively and negatively (i.e., back and forth) a predetermined number of degrees from its normal centered position. For example, the sprinkler arm can rotate one-hundred and eighty degrees (180°), i.e., ninety degrees positively and negatively with respect to a central axis extending perpendicularly upward from the base 14. The rate of rotation of the cam can be controlled by a gear reduction system (e.g., gear train), which reduces the transferred rate of rotation of the water turbine from a few hundred rotations per minute (rpm) to a lesser suitable rate of rotation per minute for efficiently cleaning the filter body 52.

Figure 7:
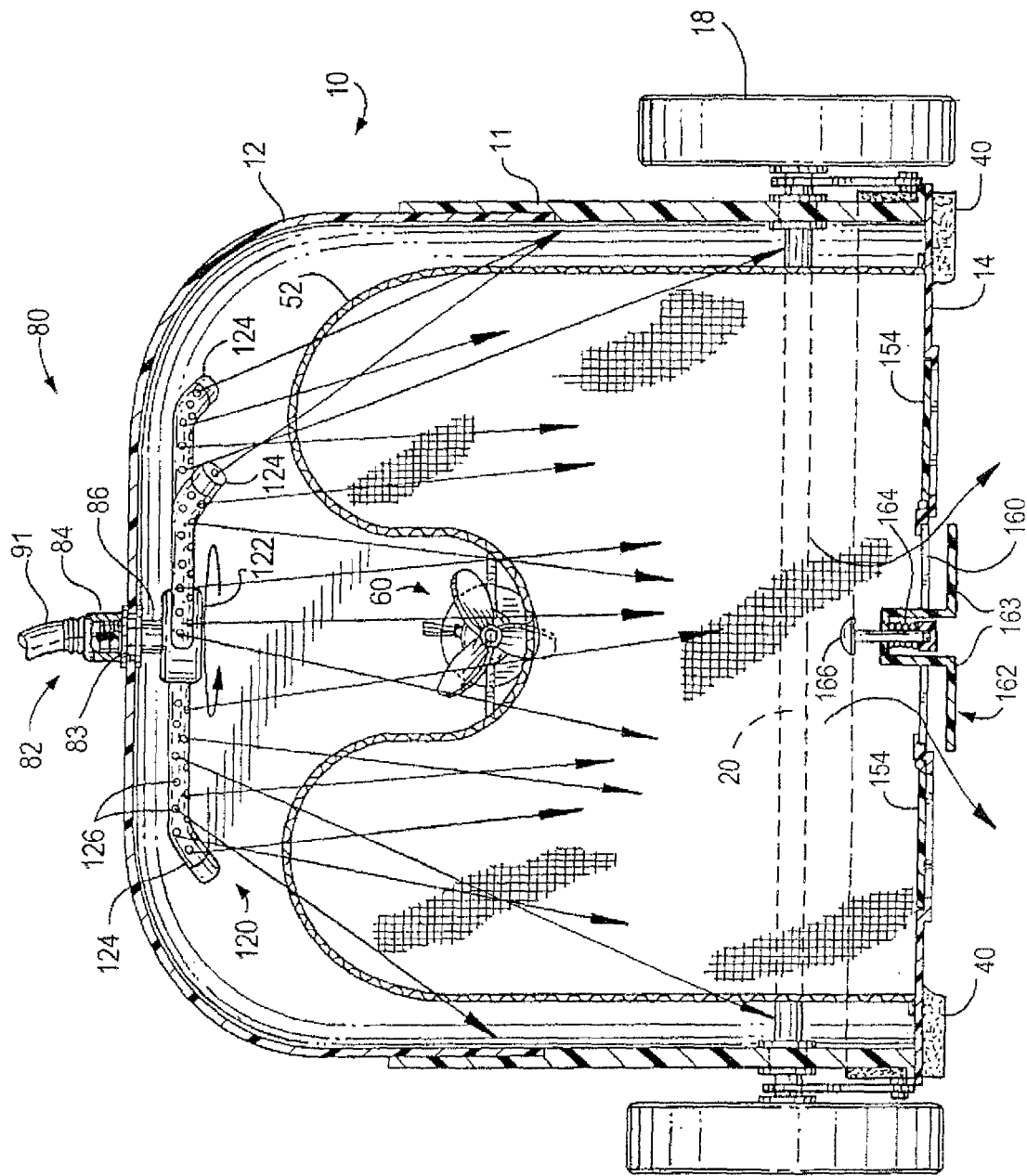
FIG. 7 is a cross-sectional front elevation view of the pool cleaner taken along lines 4-4 of FIG. 1 illustrating a third embodiment of the filter backwash assembly while spraying water over the filter assembly of the pool cleaner.

Referring to FIG. 7, a third embodiment of the backwash assembly 80 is illustratively shown. In this embodiment, the backwash assembly 80 comprises the adapter 82 and a rotating sprinkler assembly 120, which includes a central rotatable hub 122 having one or more sprinkler arms 124 extending radially outward therefrom. The sprinkler arms 124 include perforations 126 configured and positioned to spray water onto the filter media of body 52. The rotating sprinkler assembly 120 is mounted or otherwise coupled to the internal portion 86 of the adapter 82 and is positioned above the filter body 52.

During maintenance, the water from the external source (e.g., garden hose 91) is provided to the sprinkler assembly 12 via the adapter 82 as described above. The rotating sprinkler assembly 120 is rotatably attached to the internal portion 86 of the adapter preferably with bearings to facilitate smooth rotation thereof. The hub 122 includes a fixed water turbine (not shown) with angled blades. Water flowing from the external source 91 contacts the turbine and causes the hub 122 and sprinkler arms 124 to contemporaneously rotate about the central axis of the sprinkler assembly 120. The water is further channeled through each of the sprinkler arms 124 and is dispersed or otherwise sprayed from the perforations 126 onto the filter body 52. The water sprayed from the sprinkler assembly 120 forces, or otherwise creates a liquid current flow to effectuate the removal any debris from the upper portion of the filter body 52 down to the inner surfaced of the base 14, where the debris can be easily removed, as described below in further detail.

The rotating sprinkler assembly 120 illustratively shows three sprinkler arms 124 extending radially outward from the hub 122. However, a person of ordinary skill in the art will appreciate that the number of radiating sprinkler arms 124 is not limiting, as one or more sprinkler arms can be implemented. Preferably, there are at least two sprinkler arms 124 radiating outward from the hub 122 which are evenly spaced apart to balance the sprinkler assembly 120 during rotation. A person of ordinary skill in the art will also appreciate that depending on the shape of the filter body, 52, the sprinkler arms 124 can be configured substantially linear and/or include curved portions to maximize the water spray therefrom onto the filter body 52 and/or the interior walls of the chamber 26. In an alternative embodiment, the perforations 126 in the arms 124 can be aligned, such that the water jets therefrom create a common directional force to cause rotation of the assembly without a water turbine.

Figure 8:
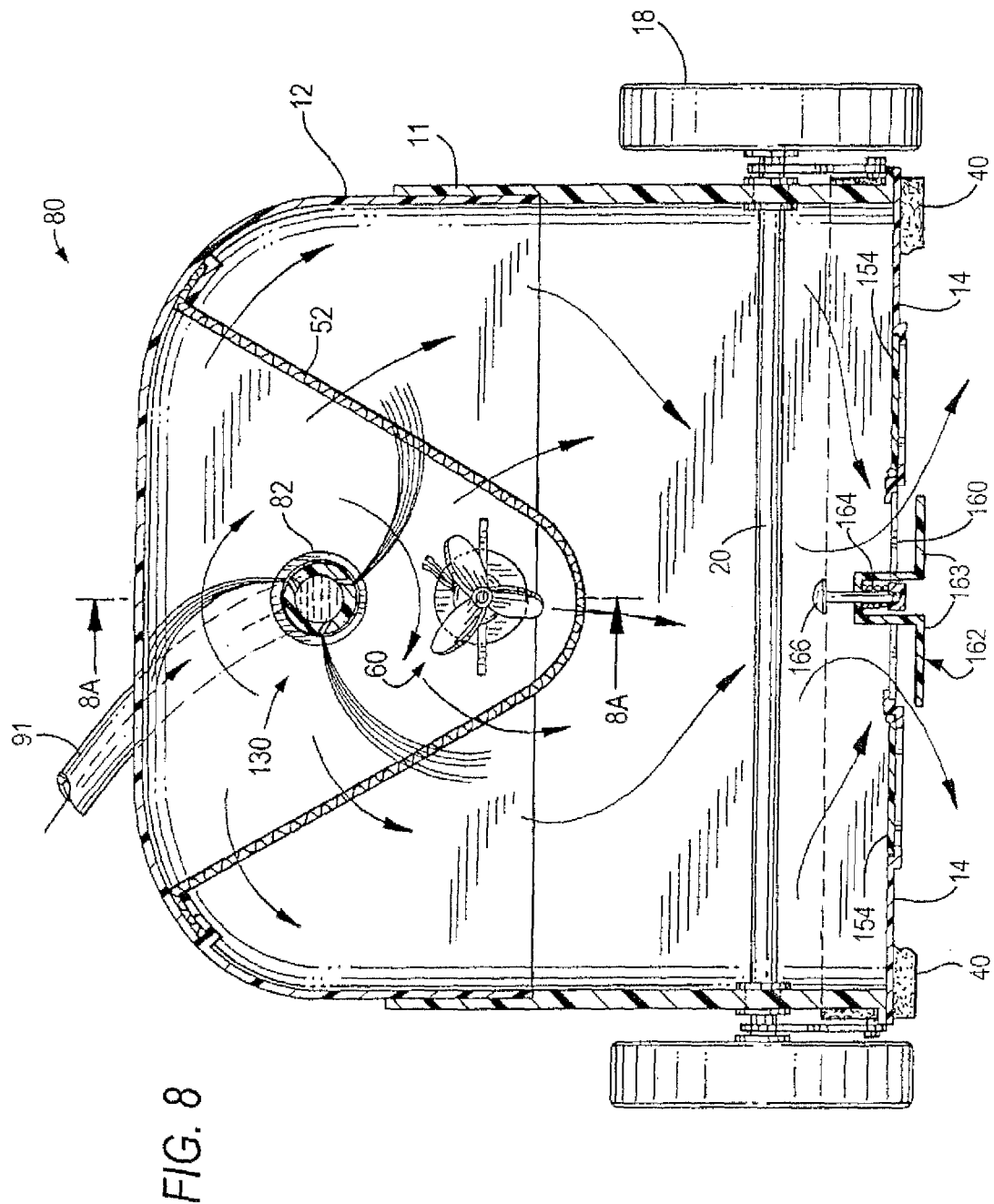
FIG. 8 is a cross-sectional front elevation view of the pool cleaner taken along lines 4-4 of FIG. 1 illustrating a fourth embodiment of the filter backwash assembly while spraying water over the filter assembly of the pool cleaner.

Referring now to FIG. 8, a fourth embodiment of the backwash assembly 80 is illustratively shown. The filter body 52 is illustratively shown as a semi-rigid V-shaped mesh or fabric material that has its opposing ends attached (e.g., clipped or otherwise fastened) to the interior surface of the housing cover 12. The apex of the V-shaped filter body 52 is illustratively curved and centrally located below the longitudinal axis of the water pump 60, and the debris accumulates below the filter body 52. The shape of the filter body 52 is for illustrative purposes only and does not form a part of the invention.

The backwash assembly 80 includes a tubular sprinkler assembly 130 mounted in the interior chamber 26 of the housing 11 with the water inlet conduit adapter 82 providing water flow thereto from an external source, such as a conventional garden hose 91, as described above with respect to the other embodiments. The inlet conduit adapter 82 is mounted through an orifice 83 formed in a sidewall of the housing cover 12 such that the internal portion 86 of the adapter 82 extends inwardly along the longitudinal axis of the cleaner 10 towards the opposing sidewall of the housing cover 12. Alternatively, adapter 82 and/or tubular sprinkler assembly 130 can be mounted transverse to the longitudinal axis of the cleaner.

Referring also to FIG. 8A, the tubular sprinkler assembly 130 is preferably an elongated cylindrical tube having a plurality of perforations 138 spaced about the tube. A proximal end of the tubular sprinkler assembly 130 is rotatably mounted to the internal portion 86 of the adapter 82 and a distal end of the tubular sprinkler assembly 130 is rotatably mounted to a support member 132. Preferably, the internal portion 86 of the adapter 82 and the support member 132 each include a set of bearings 134 that are arranged coaxially along the outer surface of each end of the tubular sprinkler assembly 130 to facilitate the rotation of the tubular sprinkler assembly 130 within the interior chamber 26 as described in detail below.

The proximal end of the tubular sprinkler assembly 130 includes a fixed water turbine 136 arranged coaxially therein. The periphery of the water turbine 136 engages the interior portion of the tubular sprinkler assembly 130 such that the frictional forces therebetween prevent the turbine from rotating within the tubular sprinkler assembly 130. Referring to FIG. 8B, the water turbine 136 can be shaped as a ring and include a plurality of angled blades 140 that extend inwardly towards a central opening 142.

During operation, water flows from the external source through the garden hose 91 and the adapter 82. The incoming water flows against the plurality of blades 140 to cause the water turbine 136 and tubular sprinkler assembly 130 to rotate in a clockwise or counter-clockwise direction, depending on the positive or negative angling of the blades 140. As illustratively shown in FIG. 8A, the angled blades cause the tubular sprinkler assembly 130 to rotate counter-clockwise from the perspective of the incoming water. Once the incoming water turns the blades, the water flows through the central opening 142 and through the interior portion of the tubular sprinkler assembly 130, where the water is sprayed out of the plurality of perforations 138 into the interior chamber 26 and onto the filter body 52.

The above described embodiments of the interior backwash assembly 80 spray a stream of water onto the filter body 52 to clean, dislodge and otherwise remove debris from the filter medium. The dislodged debris falls or otherwise moves to the interior bottom surface 27 of the base 14, where it can be removed from the cleaner 10. In one embodiment, the housing 11 can be unfastened and lifted off of the base 14 so that the fallen debris resting on the interior bottom surface 27 of the base 14 can be removed by hand.

Referring to FIGS. 9-12, in one embodiment, the cleaner 10 includes a tray 150 which is slidably mounted within opposing channels 152 (e.g., FIGS. 9 and 11) illustratively formed on the bottom, side edges of the housing 11 or opposing edges of the base 14. The tray 150 can be slidably moved from underneath the cleaner 10 to facilitate the removal of the debris in the interior chamber 26. The channels 152 extend longitudinally substantially along the length of the cleaner 10. If required, the brush 40 can be manually lifted upwards to access and slide the tray 150 outward from the bottom of the cleaner 10. The tray 150 includes one or more inlet ports 16 for enabling the water and the debris from the pool to be drawn into the interior of the cleaner 10 and filtered by the filter body 52 as described above. Each inlet port 16 can include a flap or cover 154 which is hinged 156 (FIG. 9) on one side of the water inlet 16. The cover 154 closes its respective inlet port 16 when the water pump 60 is switched off.

Figure 10:
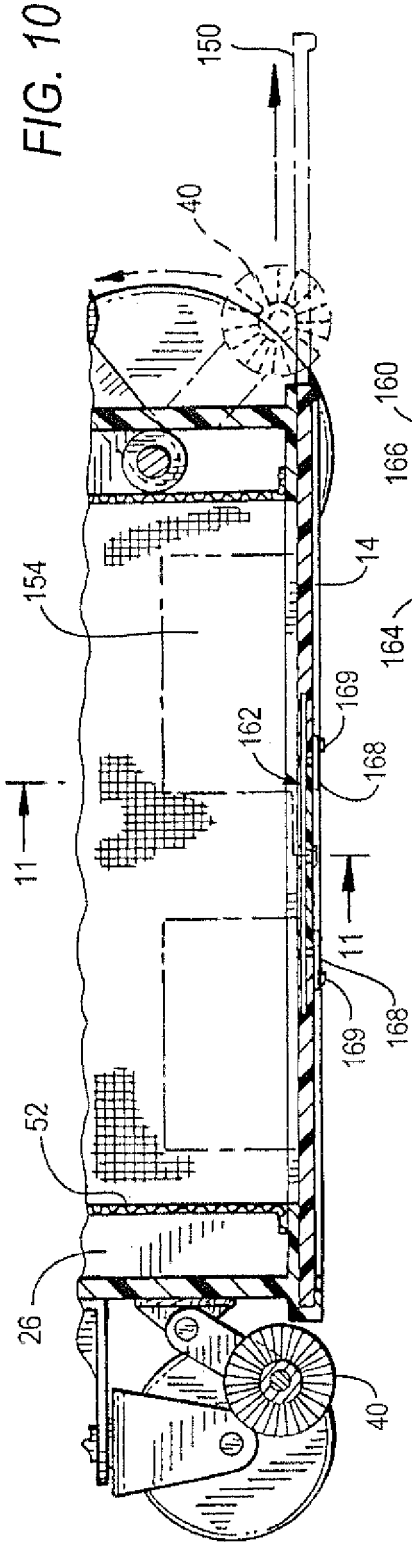
FIG. 10 is a side elevation view in partial cross-section of the slidable tray taken along lines 10-10 of FIG. 9.
Figure 11:
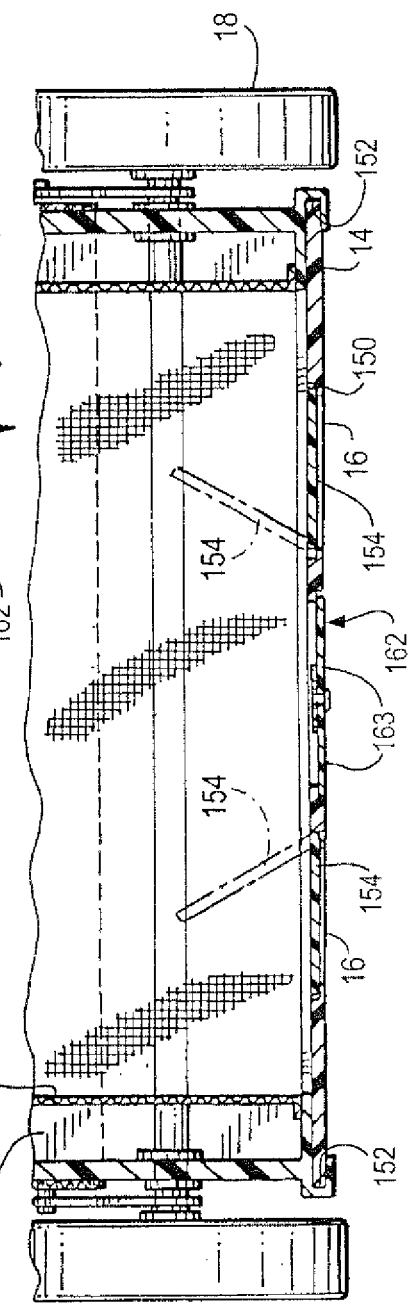
FIG. 11 is a front elevation view in partial cross-section of the slidable tray taken along lines 11-11 of FIG. 10 and illustrating a retractable debris outlet port in an closed state.

Referring also to FIGS. 10 and 11, when the water pump 60 is activated, a low pressure environment within the interior chamber 26 is induced, which causes the hinged covers 154 to turn and extend upward from the base plate 14 towards the interior chamber 26, as illustratively shown in phantom in FIGS. 10 and 11. Water and debris from the pool is then drawn into the interior chamber 26 for filtering and discharge.

In addition, the tray 150 can include one or more debris outlet ports 160 for allowing the water and debris that is sprayed from the sprinkler assemblies to flow out of the interior chamber 26 of the cleaner 10 during maintenance. The debris outlet port 160 can be included to allow the water to escape from the interior chamber 26 without removing the tray 150 during the filter maintenance process. The tray 150 is illustratively shown as being substantially planar. However, a person of ordinary skill in the art will appreciate that the tray 150 can be curvilinear, arcuate or otherwise curved (e.g. concave) to enhance the flow of the waste water and debris towards the debris outlet port 160. Additionally, channels or grooves (not shown) can be formed in the bottom surface, which are directed from the periphery of the tray towards the outlet port 160.

Figure 12:
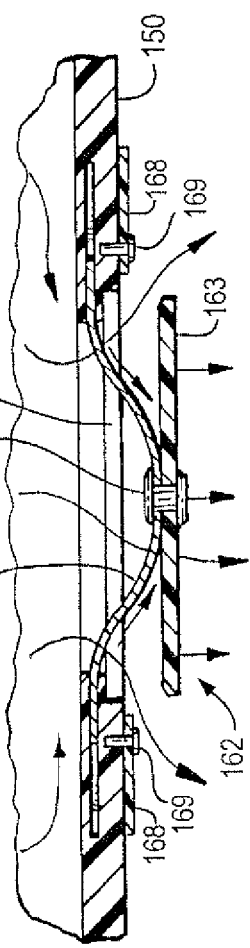
FIG. 12 is an exploded cross-sectional view of the slidable tray of the retractable outlet port in an open state for removing the debris during maintenance of the pool cleaner.

Referring now to FIG. 12, a debris outlet cover assembly 162 is mounted over the outlet port 160. The outlet cover assembly 162 includes a planar cover 163 configured to close the outlet port 160, and a resilient member or spring 164 which is attached to the cover 163 by a fastener 166. In one embodiment, the resilient member 164 can be shaped as an elongated flat spring having opposing ends fixedly attached to respective opposing ends of the outlet port 160 and a center portion fixedly attached to the planar cover 163 by the fastener 166. The shape of the debris outlet port 160, its corresponding cover 162 and the manner in which the resilient member 166 is attached therebetween is not considered limiting. Additionally, one or more latches 168 (e.g., rotatable latches) can also be fastened to the underside of the base plate 14 or tray 150 with a corresponding fastener 169 to lock and retain the cover 163 in a closed position. In this manner, debris is prevented from escaping from the interior chamber 26 when the cleaner 10 is being removed from the pool, for example during maintenance.

During the filter cleaning maintenance operation, the water that is sprayed from the sprinkler assembly flows onto the filter body 52 and internal walls of the interior chamber 26. The sprayed water and dislodged debris flow downward to the tray 150 such that the force of the water will push the resilient member 164 and cover 162 downward so that the cover 163 is displaced from and below the outlet port 160. The sprayed water and small amounts of debris can then flow through the outlet port 160 and out of the interior chamber 26 so that the interior chamber does not fill up with the cleansing water. Once the water from the external source is turned off, the tray 150 can be slidably removed from the bottom portion of the cleaner 10. The user can then access and clean the debris from the filter body 52 and interior chamber 26.

Referring again to FIGS. 4 and 5, an alternative embodiment of the outlet port 160 is illustratively shown. The outlet port 160 includes a debris outlet cover assembly 162 which has a central portion 165 extending upwards into the interior chamber 126 and sized to house a coil-shaped spring 164 with a fastener 166. A flange forming a cover 163 is formed at a lower end of the central portion 165. The fastener 166 extends normally with respect to the base 14, i.e., through the central portion 165 of the cover assembly 162 and along the central axis of the coil spring 164, and is secured to the bottom of the base 14. The coil spring 166 is positioned and maintained in an expanded state between an interior surface of the central portion 165 and the bottom surface of the base 14.

Figure 5:
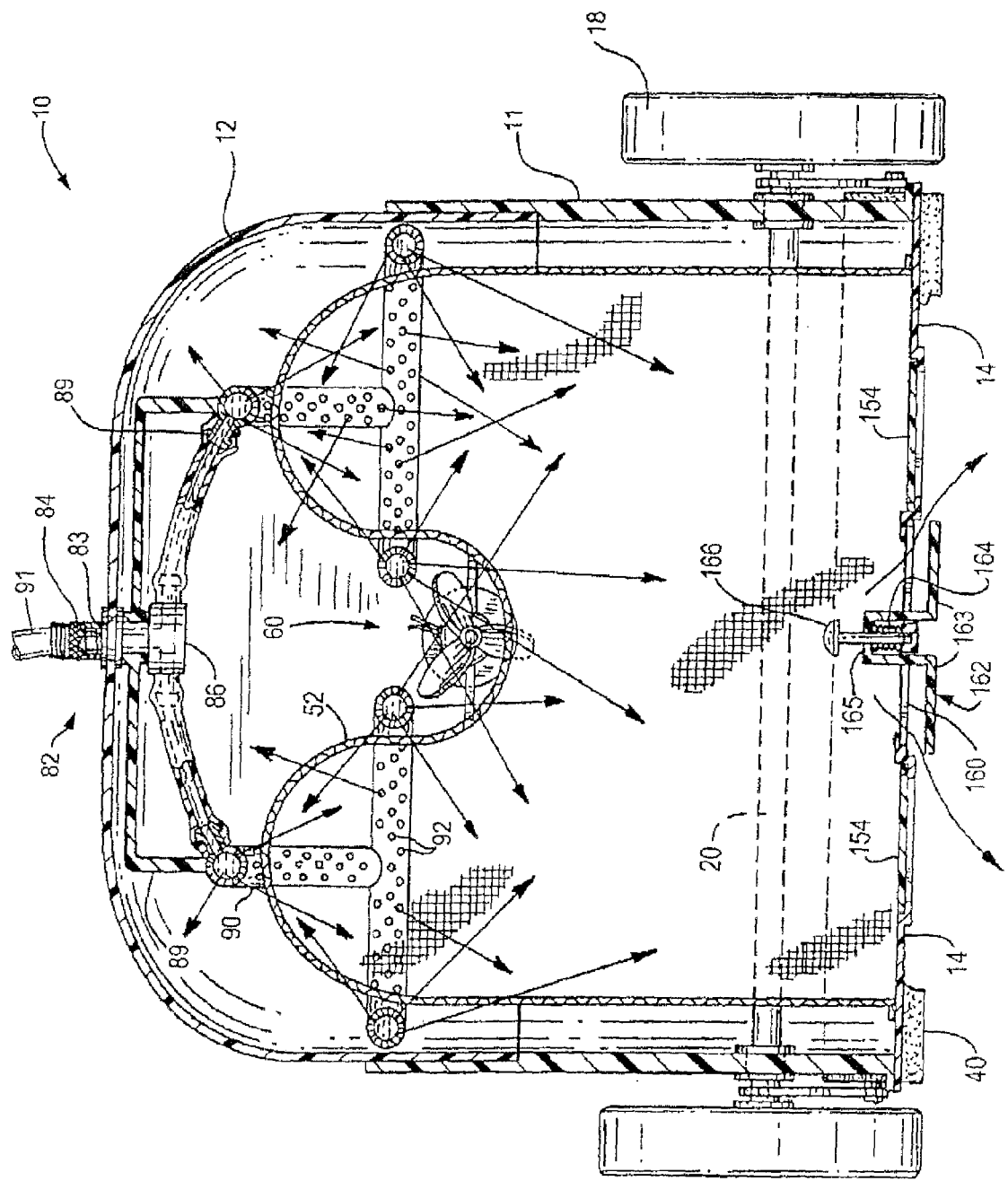
FIG. 5 is the same as FIG. 4 schematically illustrating the pattern of a fluid sprayed on the filter medium of the filter assembly of the pool cleaner.

Referring to FIG. 5, during the filter cleaning maintenance operation, the sprayed water and dislodged debris flow downward to the bottom of the base 14 (or tray 150 if present), such that the force of the water will push the central portion 165 and cover 163 downward so that the coil spring 164 compresses, and the cover 163 is displaced from and below the outlet port 160. The sprayed water and small amounts of debris can then flow through the outlet port 160 and out of the interior chamber 26 so that the interior chamber does not fill up with the cleansing water. Once the water from the external source is turned off, the compressed coiled spring 164 returns to its normal expanded state and the cover 163 rises upward to be seated against the periphery of the outlet port 160 formed in the base 14 or the tray 150.

A person of ordinary skill in the art will appreciate that removal of the debris from the interior chamber 26 is not limited to the tray 150 and outlet port 160 embodiments as described above, as other embodiments for removing debris from the interior chamber 26 are envisioned. For example, debris that is washed down to the bottom of the interior chamber can also be removed by providing access through one or more side walls of the housing (e.g., an access panel), or by lifting the housing cover up and away from the base, among other techniques.

Figure 9:
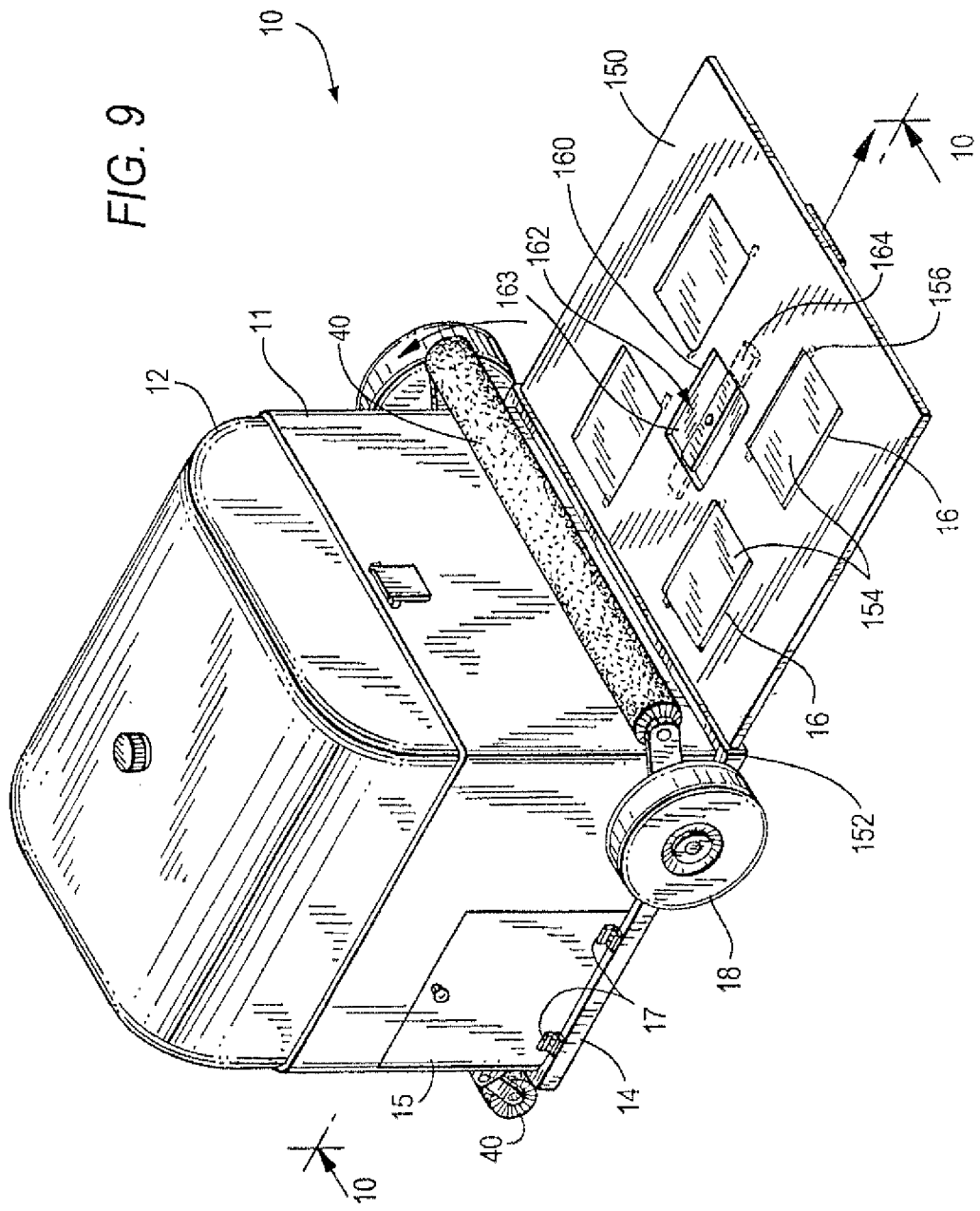
FIG. 9 is a top, right side perspective view of an embodiment of the self-propelled robotic pool or tank cleaner of FIG. 1 illustrating a slidable tray extending from the bottom of the cleaner for removing debris during maintenance.

Referring to FIG. 9, an access panel 15 (shown in phantom) is provided along a sidewall of the housing 11. The access panel 15 is illustratively shown as being hinged 17 or otherwise fastened to the base 14. A person of ordinary skill in the art will appreciate one or more access panels can be hinged or otherwise secured to other portions of the cleaner housing, such as an adjacent sidewall of the housing 11. The access panel 15 is opened manually to permit an operator to remove the debris from the interior chamber 26. A person of ordinary skill in the art will further appreciate that any access panel 15 and/or other debris outlet port(s) is sealed during the pool cleaning operations of the cleaner 10 to prevent any water from entering therethrough. In this manner, the low pressure environment in the interior chamber 26, which is created by the water pump, is maximized to draw the pool water only through the inlet ports 16 provided in the base 14 or tray 150 of the cleaner 10.

The self-propelled robotic pool or tank cleaner includes an internal filter backwash assembly 80 that sprays or otherwise delivers a pressurized stream of water over an internal filter body 52 within the interior chamber 26 of the cleaner 10. The positioning of the backwash assembly 80 within the interior chamber 26 of the housing 11 permits water sprayed onto the filter body 52 to naturally flow downwards due to gravitational forces to help dislodge and remove debris from the filter medium of the filter body 52. The cleansing water and debris can then be removed from the interior chamber 26 of the cleaner 10 by removing the housing cover from the base 14 or slidably removing a tray 150 to open the bottom portion of the base and allow the debris to fall out and provide additional access into the interior chamber 26 and filter body 52 for additional cleaning by the user.

The backwash assembly of the present invention has numerous advantages not before known to the prior art. One advantage is that a user can quickly and easily attach a garden hose to the housing cover and provide a steady supply of water to an interior sprinkler assembly, which expediently and efficiently cleans the interior chamber and filter devices therein. Another advantage is that the water is more evenly sprayed or otherwise dispersed over the filter body to efficiently dislodge debris from the fabric medium (e.g., mesh) of the filter. Additionally, the even distribution of water over the filter body minimizes the possibility of damage to the filter medium from a concentrated stream of water being directed at a particular area of the filter fabric. Moreover, the backwash assembly's cleaning efficiencies which are achieved by evenly dispersing the water to clean the interior chamber helps to reduce water consumption during the cleaning process.

A further advantage includes the rinsing of the filter without having to manually remove it from the interior chamber of the cleaner. In this manner, damage to the filter is minimized because the user does not have to physically remove the filter from the cleaner, handle it during the rinsing process, and then properly reinstall the filter in the cleaner.

While the foregoing is directed to embodiments of the present invention that have been illustrated in the accompanying drawings, other and further embodiments and advantages of the invention can be devised by those of ordinary skill in the art based on this description without departing from the basic scope of the invention, which is to be determined by the claims that follow.

I claim:

1. A self-propelled robotic cleaning apparatus for cleaning a submerged surface of a swimming pool comprising:
   a housing comprising a cover and a base defining an interior chamber, the base having at least one water inlet configured to admit water into, and prevent backflow of water from the interior chamber;
   means for propelling the cleaning apparatus including rotationally-mounted supports coupled to the housing for moving the apparatus over the submerged surface of the swimming pool;
   a filter assembly positioned within the interior chamber and in fluid communication with the at least one water inlet for capturing debris in the water flowing into the interior chamber through the at least one water inlet from the pool;
   a debris discharge opening formed in the housing for discharging debris from the filter assembly and housing, the discharge opening having a releasable closure; and
   a filter backwash assembly positioned within, and configured to dislodge the captured debris from the interior chamber, the filter backwash assembly having at least one fluid discharge outlet for directing a pressurized flow of a fluid towards at least the filter assembly to dislodge the captured debris for discharge through the debris discharge opening.

2. The cleaning apparatus of claim 1, wherein the filter backwash assembly includes at least one tube coupled from an interior portion of the housing cover and configured to circumscribe at least a portion of the filter assembly, the at least one tube including a plurality of spaced-apart perforations for providing the pressurized flow of fluid directed towards at least the filter assembly.

3. The cleaning apparatus of claim 2, wherein the filter backwash assembly is suspended from a mounting bracket having a lower portion coupled to the at least one tube and an upper portion extending through an orifice formed in the housing cover, the upper portion being configured to receive a pressurized fluid from an external source.

4. The cleaning apparatus of claim 2, wherein at least one tube comprises a plurality of tubes having a plurality of spaced apart perforations.

5. The cleaning apparatus of claim 1, wherein the upper portion of the mounting bracket is configured to receive the fluid from a hose.

6. The cleaning apparatus of claim 1, wherein the filter backwash assembly includes an oscillating sprinkler coupled from the interior of the housing and configured to oscillate in a predetermined pattern over the filter assembly.

7. The cleaning apparatus of claim 6, wherein the oscillating sprinkler extends in a normal direction from the housing cover relative to a longitudinal axis of the cleaning apparatus.

8. The cleaning apparatus of claim 6, wherein the at least one fluid discharge outlet is a sprinkler arm, and the oscillating sprinkler further comprises a means for oscillating the sprinkler arm coupled to the sprinkler arm, the sprinkler arm including a plurality of spaced-apart perforation.

9. The cleaning apparatus of claim 8, wherein the oscillating means includes a fluid turbine operatively coupled to the sprinkler arm.

10. The cleaning apparatus of claim 8, wherein the oscillating means includes a motor coupled to the sprinkler arm.

11. The cleaning apparatus of claim 1, wherein the filter backwash assembly includes a rotating sprinkler assembly coupled from an interior portion of the housing and configured to rotate about the filter assembly, the at least one fluid discharge outlet including a plurality of spaced-apart perforations.

12. The cleaning apparatus of claim 11, wherein the rotating sprinkler assembly includes a plurality of sprinkler arms extending radially outward at equally spaced-apart intervals.

13. The cleaning apparatus of claim 1, wherein the filter backwash assembly includes a tubular sprinkler assembly coupled from an interior portion of the housing cover and configured to rotate above the filter assembly.

14. The cleaning apparatus of claim 13, wherein the tubular sprinkler assembly includes a fluid turbine for rotating the tubular sprinkler assembly.

15. The cleaning apparatus of claim 1, wherein the debris discharge opening comprises means for releasing the fluid and debris from within the interior chamber of the cleaning apparatus.

16. The cleaning apparatus of claim 15, wherein the debris discharge opening is formed in a tray slidably coupled to at least one of the base and housing.

17. The cleaning apparatus of claim 16, wherein the tray includes a debris outlet port.

18. The cleaning apparatus of claim 15, wherein the releasable closure of the debris discharge opening includes an access panel formed in a sidewall of the housing.

19. The cleaning apparatus of claim 15, wherein the debris discharge opening is formed in the base.

20. The cleaning apparatus of claim 1, wherein the filter backwash assembly further includes a fluid inlet formed in the housing, the fluid inlet being communicably coupled and configured to provide the fluid to the at least one fluid discharge outlet.

21. The cleaning apparatus of claim 20, wherein the fluid inlet is configured to connect to a hose to provide the fluid from an external source.

22. The cleaning apparatus of claim 20, wherein the fluid inlet is connected to a shutoff valve for controlling flow of fluid to the at least one fluid discharge outlet.

23. The cleaning apparatus of claim 1, wherein the filter assembly is fabricated from a filter material having deformation resistant and original shape-retaining characteristics.

24. The cleaning apparatus of claim 1, wherein the filter backwash assembly is operational when the robotic cleaning apparatus is outside of the pool or tank and the at least one water inlet is coupled to a pressurized fluid via a hose.

25. The cleaning apparatus of claim 1, wherein the debris discharge opening is provided by the housing.

26. The cleaning apparatus of claim 1, wherein the debris discharge opening includes a non-filter medium portion of the filter assembly.

27. The cleaning apparatus of claim 1, wherein the pressurized flow of a fluid is directed towards at least the filter assembly after a cleaning operation by the cleaning apparatus is terminated.

28. The cleaning apparatus of claim 1, wherein the captured debris is removed from the filter assembly and housing during a non-cleaning operation of the cleaning apparatus.

29. The cleaning apparatus of claim 1, further comprising a covering respectively positioned over each water inlet.

30. The cleaning apparatus of claim 1, wherein the fluid discharge outlet is spaced apart from said at least one water inlet.

* * * * *